C. ELLIS.
PROCESS OF CONCENTRATING SULFITE WASTE LIQUOR.
APPLICATION FILED FEB. 16, 1912.
1,057,416.
Patented Apr. 1, 1913.
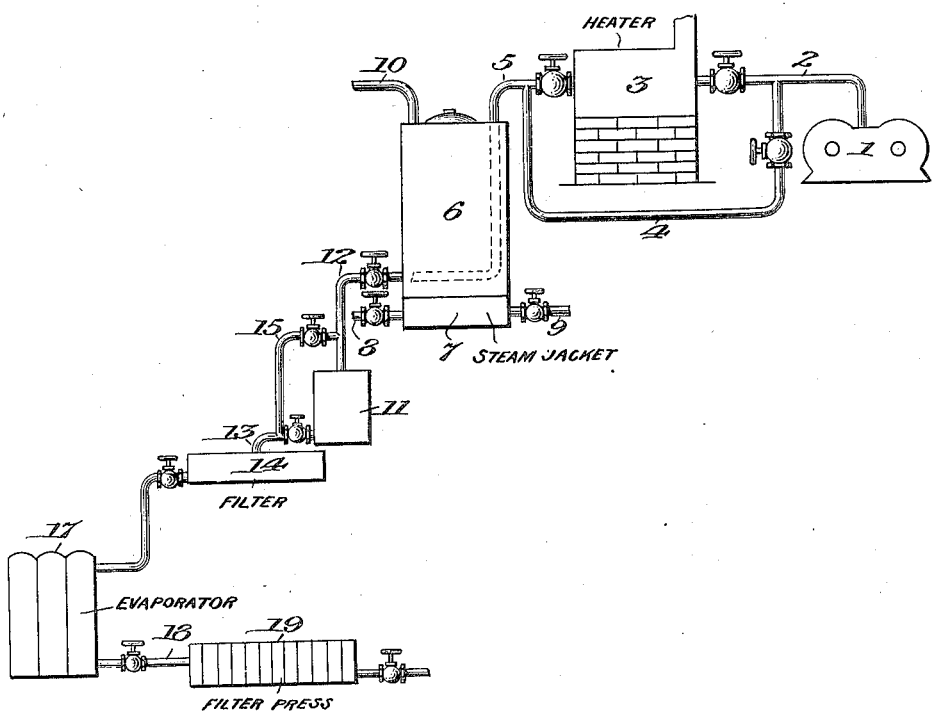

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF CONCENTRATING SULFITE WASTE LIQUOR.

1,057,416.

Specification of Letters Patent.

Patented Apr. 1, 1913.

Application filed February 16, 1912. Serial No. 678,153.

*To all whom it may concern:*

Be it known that I, CARLETON ELLIS, a citizen of the United States, residing at Montclair, in the county of Essex and State of New Jersey, have invented certain new and useful Improvements in Processes of Concentrating Sulfite Waste Liquor, of which the following is a specification.

This invention relates to the concentration or utilization of waste sulfite liquor and to the process of making same and relates particularly to a method of concentration whereby hydrolytic changes are brought about during the concentration which result in the production of a concentrated liquor having many useful properties.

In the manufacture of concentrated waste sulfite liquor, it has heretofore been proposed to neutralize the liquor and concentrate it in a multiple effect vacuum pan as for instance the Ekman process, German Patent 81,643, etc. The treatment of sulfite liquor in this manner results in its concentration without any substantial change in its chemical composition and therefore does not succeed in developing to the highest degree the useful dextrinous properties which are secured by treatment in the manner hereinafter described.

By the present process, the crude unconcentrated liquor is first preferably blown with air, in order to remove any free sulfurous acid which acid later may be recovered by passing the sulfurous-acid-containing air into a suitable absorbing chamber. The air used for this purpose may be heated or the liquor itself may be warmed or both the air and liquor may be used in a heated condition. The sulfurous acid removed may be converted into lime sulfite or lime and magnesium sulfite or bi-sulfite suitable for use again in the pulp digesters. After the liquor has been freed from a substantial proportion of free sulfurous acid gas, it is treated with ordinary quicklime or ordinary dolomite lime or with soda pulp waste lye until it is alkaline. It may then be filtered through a filter bed and conducted into a vacuum pan which preferably should be a multiple effect evaporator in order to secure rapid and inexpensive concentration. Here the liquor is evaporated to a consistency of 25 to 33° Bé. and during this operation, owing to the alkaline character of the liquor, reactions occur which produce the dextrinous bodies desired.

As a modification, the lime or other alkali added to produce an alkaline reaction may be introduced into the liquor prior to the air treatment, and by aeration in the presence of an alkaline body, dextrinous changes are set up which may be satisfactorily completed in the evaporators. After passing through the evaporators, the liquor may be run through a filter press in order to remove certain insoluble products which are formed as the result of the alkaline hydrolysis, and by such filtration a clear transparent liquor is produced. This may be rendered neutral or acid as desired.

A satisfactory method of securing the alkaline solution is that of neutralization to a large extent with lime and the subsequent addition of soda pulp waste liquor to secure an alkaline reaction. Suitable proportions of lime to caustic soda are 7:1 up to 10:1. Instead of soda pulp waste liquor carbonate of soda or caustic soda may be employed.

The accompanying diagrammatic drawings show in elevation the manner in which the process may be carried out.

In the drawings, 1 is a pressure blower supplying air to the aerating chamber 6 through the pipe 2, preheater 3 and pipe 5. The by-pass is arranged to shunt cold air around the preheater 3, when the air is used at ordinary temperatures. The air discharges at the bottom of the aerating chamber 6 and escapes through the pipe 10. The chamber 6 is provided with a double bottom 7, through which steam is passed by the means of inlet 8 and outlet 9. From the aerating chamber, a pipe 12 leads to the settling tank 11. This is connected with the filter bed 14 by the pipe 13. A by-pass 15 permits of cutting out of tank 11 if desired. From the filter bed, a pipe 16 leads to the evaporator 17, and a discharge pipe 18 leads from the evaporator 17 to the filter press 19.

In carrying out the invention with the apparatus above indicated, the tank 6 is filled with waste sulfite liquor and is preferably heated to a temperature of about 40°. Air at a temperature of 60 or 80° C. is introduced into the tank under pressure exerted by the blower 1. The free sulfurous acid is removed with the air which escapes through the exit pipe 10. Lime may then be added to make an alkaline solution and the liquor further treated with heated air allowing the temperature of the liquor to gradually rise until it reaches about 60° C. At this point, the liquor may be run into the filtering chamber 11 and then through the filter bed 14. The clear liquid from the filter bed 14 passes into the multiple effect evaporator 17 and is there reduced to a gravity of from 25 to 33° Bé. or thereabout, at the same time, being hydrolyzed and partially converted into dextrinous bodies, or bodies of that character, with the formation of a small amount of insoluble material. If hydrolysis is not carried on in the tank 6 by the addition of lime to alkalinity with subsequent air treatment, the treatment in the settling tank 11 may be omitted and the liquor may be sent direct to the filter bed 14 by the shunt 15. The liquor passed in this manner has many uses. For example, it may be employed as a briqueting material or binder in the manufacture of fuel briquets and as a binder for similar bonding operations. It may be used as a paper size and especially as a size and mordant in conjunction with gelatin or glue. It may be salted out from its concentrated solution as a precipitate which may be dried and used as a dextrin substitute. The drying may be carried out by means of heated air in admixture with the atomized concentrated liquor. The liquor may be acidified and tanning compositions produced therefrom, or if desired, rendered entirely neutral and used as an addition to tanning extracts. For tanning purposes, the liquor is of a more useful character than that produced by evaporation of a neutral liquor as the hydrolytic changes set up in the composition during its treatment in alkaline solution, result in the elimination of certain of the semiresinous bodies which are detrimental to leather. Emulsions may be made from it with mineral oils such as kerosene oil and the like producing useful insecticides. Emulsions may also be made from tar acids and coal tar and the like. Some of these emulsions are particularly useful in the laying of road dust. The liquor of itself dries to a rather brittle product which is not especially well adapted to be used alone as a road dust layer, but in conjunction with a small amount of calcium chlorid or magnesium chlorid, a desirable dust layer and road binder is secured.

The formaldehyde addition products have some uses as a disinfectant and in connection with the sizing and waterproofing of paper with glue. The tar acid compositions may be used as sheep dips as the sulfite liquor in the present form is a useful substitute for the rosin soap ordinarily employed. A neutral liquor may be used as an addition to prepared foods intended for horses and cattle and acts as a binder and nutrient material. For this purpose, I prefer to push the hydrolysis as far as possible in order to make the composition readily assimilable.

Having described my invention to the details of which I do not wish to be limited, what I claim is:—

1. The process of treating waste sulfite liquor which comprises blowing with air to remove a portion of the free sulfurous acid, neutralizing to alkaline reaction and concentrating under diminished atmospheric pressure and in freeing said liquor from insoluble products of hydrolysis.

2. The process of treating waste sulfite liquor comprising aerating with air to remove a substantial proportion of the free sulfurous acid, adding an alkali to produce an alkaline reaction, filtering and concentrating under diminished atmospheric pressure and in freeing said liquor from insoluble products of hydrolysis.

3. The process of treating waste sulfite liquor comprising blowing with air to remove free sulfurous acid, rendering alkaline, further aerating and heating the composition to develop hydrolytic changes, and concentrating under diminished atmospheric pressure and in freeing said liquor from insoluble products of hydrolysis.

4. The process of treating waste sulfite liquor comprising blowing with heated air to remove free sulfurous acid, rendering slightly alkaline and concentrating under diminished atmospheric pressure, whereby products of hydrolysis are produced and in freeing said liquor from insoluble products of hydrolysis.

5. The process of treating waste sulfite liquor comprising heating said liquor to a temperature of about 40°, aerating with air at a temperature of 60°, rendering alkaline with lime, and heating the liquor to about 60° with continued aeration, whereby hydrolytic changes are developed, in filtering the liquor and concentrating under diminished atmospheric pressure and in freeing said liquor from insoluble products of hydrolysis.

In testimony whereof I have affixed my signature in presence of two witnesses.

CARLETON ELLIS.

Witnesses:
ALFRED C. MEYER,
FRANCES I. NEWMAN.